(12) United States Patent
Agarwal et al.

(10) Patent No.: US 11,694,120 B2
(45) Date of Patent: Jul. 4, 2023

(54) GENERATION AND USAGE OF SEMANTIC FEATURES FOR DETECTION AND CORRECTION OF PERCEPTION ERRORS

(71) Applicant: HRL Laboratories, LLC, Malibu, CA (US)

(72) Inventors: Amit Agarwal, Cedar City, UT (US); Amir M. Rahimi, Santa Monica, CA (US); Hyukseong Kwon, Thousand Oaks, CA (US); Rajan Bhattacharyya, Sherman Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 324 days.

(21) Appl. No.: 17/190,346

(22) Filed: Mar. 2, 2021

(65) Prior Publication Data

US 2021/0192219 A1   Jun. 24, 2021

Related U.S. Application Data

(63) Continuation-in-part of application No. 17/030,354, filed on Sep. 23, 2020, now Pat. No. 11,334,767.
(Continued)

(51) Int. Cl.
*H04N 7/18* (2006.01)
*G06K 9/32* (2006.01)
(Continued)

(52) U.S. Cl.
CPC ............ *G06N 20/00* (2019.01); *G06N 5/04* (2013.01); *G06V 10/85* (2022.01); *G06V 20/10* (2022.01); *G06V 20/41* (2022.01); *G06V 20/56* (2022.01)

(58) Field of Classification Search
CPC ............ G06N 20/00; G06N 5/04; G06N 7/01; G06V 10/85; G06V 20/10; G06V 20/41; G06V 20/56; G06F 18/295
See application file for complete search history.

(56) References Cited

U.S. PATENT DOCUMENTS 8,027,946 B1 * 9/2011 Daily ................. G06F 11/2257
706/47
9,008,840 B1 4/2015 Ponulak
(Continued)

OTHER PUBLICATIONS

Notification of the International Preliminary Report on Patentability Chapter 1 for PCT/JS2021/020555; dated Sep. 15, 2022.
(Continued)

*Primary Examiner* — Howard D Brown, Jr.
(74) *Attorney, Agent, or Firm* — Tope-McKay & Associates

(57) ABSTRACT

Described is a system for detecting and correcting perception errors in a perception system. In operation, the system generates a list of detected objects from perception data of a scene, which allows for the generation of a list of background classes from backgrounds in the perception data associated with the list of detected objects. For each detected object in the list of detected objects, a closest background class is identified from the list of background classes. Vectors can then be used to determine a semantic feature, which is used to identify axioms. An optimal perception parameter is then generated, which is used to adjust perception parameters in the perception system to minimize perception errors.

15 Claims, 8 Drawing Sheets

Related U.S. Application Data

(60) Provisional application No. 62/984,713, filed on Mar. 3, 2020, provisional application No. 62/984,728, filed on Mar. 3, 2020, provisional application No. 62/905,059, filed on Sep. 24, 2019.

(51) Int. Cl.
  *G06N 20/00* (2019.01)
  *G06N 5/04* (2023.01)
  *G06V 20/40* (2022.01)
  *G06V 20/10* (2022.01)
  *G06V 10/84* (2022.01)
  *G06V 20/56* (2022.01)

(56) References Cited

U.S. PATENT DOCUMENTS

| | | | |
|---|---|---|---|
| 9,626,591 B2 | 4/2017 | Holz et al. | |
| 10,699,419 B2* | 6/2020 | Cui | G06V 20/00 |
| 2011/0051992 A1* | 3/2011 | Cobb | G06V 20/52 382/100 |
| 2012/0188365 A1* | 7/2012 | Stork | B23K 26/046 348/90 |
| 2015/0378696 A1* | 12/2015 | Boehm | G06F 8/445 717/149 |
| 2016/0165193 A1* | 6/2016 | Rasheed | G06V 20/52 348/143 |
| 2017/0364831 A1* | 12/2017 | Ghosh | G06F 40/40 |
| 2018/0005118 A1* | 1/2018 | Kapoor | G06N 7/01 |
| 2020/0036743 A1* | 1/2020 | Almukaynizi | G06N 5/048 |
| 2020/0111005 A1* | 4/2020 | Ghosh | G06N 3/042 |
| 2021/0011461 A1* | 1/2021 | Fowler | G05B 19/4155 |
| 2021/0081751 A1* | 3/2021 | Boss | G06V 40/20 |
| 2021/0089837 A1 | 3/2021 | Kwon et al. | |

OTHER PUBLICATIONS

The International Preliminary Report on Patentability Chapter I for PCT/US2021/020555; dated Sep. 15, 2022.
Notification of Transmittal and the International Search Report, and the Written Opinion of the International Searching Authority for PCT/US2020/052342; dated Feb. 2, 2021.
Yulong Wu, et al., "Active Control of Camera Parameters for Object Detection Algorithms", arxiv.org, Cornell University Library, 201. Olin Library Cornell Uni Versity Ithaca, NY, 14853, May 16, 2017 (May 16, 2017), XP080948249.
Balakrishnan Anand, et al., "Specifying and Evaluating Quality Metrics for Vision-based Perception Systems", 2019 Design, Automation & Test in Europe Conference & Exhibition (DATE), EDAA, Mar. 25, 2019 (Mar. 25, 2019), pp. 1433-1438, XP033550188.
Tuncali Cumhur Erkan, et al., "Simulation-based Adversarial Test Generation for Autonomous Vehicles with Machine Learning Components", 2018 IEEE Intelligent Vehicles Symposium (IV), IEEE, Jun. 26, 2018 (Jun. 26, 2018), pp. 1555-1562, XP033423320.
Notification of Transmittal of the International Search Report and the Written Opinion of the International Searching Authority for PCT/US2021/020555; dated Dec. 23, 2021.
The International Search Report Search Strategy for PCT/US2021/020555; dated Dec. 23, 2021.
The International Search Report of the International Searching Authority for PCT/JS2021/020555; dated Dec. 23, 2021.
The Written Opinion of the International Searching Authority for PCT/US2021/020555; dated Dec. 23, 2021.
Gupta, Dikshant, et al., "A Multi-Space Approach to Zero-Shot Object Detection," 2020 IEEE Winter Conference on Applications of Computer Vision (WACV), IEEE, Mar. 1, 2020 (Mar. 1, 2020), pp. 1198-1206.
A. Dokhanchi, H.B. Amor, J.V. Deshmukh, and G. Fainekos, "Evaluating perception systems for autonomous vehicles using quality temporal logic," International Conference on Runtime Verification, pp. 409-416, 2018.
R.R. da Silva, V. Kurtz, and M. Hebert, "Active Perception and Control from Temporal Logic Specifications," arXiv:1905.03662, pp. 1-6, 2019.
S. Jha, V. Raman, D. Sadigh, and S.A. Seshia, "Safe Autonomy Under Perception Uncertainty Using Chance-Constrained Temporal Logic," Journal of Automated Reasoning, pp. 43-62, 2018.
D. Sadigh and A. Kapoor, "Safe control under uncertainty with Probabilistic Signal Temporal Logic," in Proc. Of Robotics: Science and Systems, pp. 1-10, 2016.
J. A. Stark, "Adaptive Image Contrast Enhancement Using Generalizations of Histogram Equalization," IEEE Transactions on Image Processing, vol. 9, No. 5, pp. 889-896, 2000.
V. Vonikakis, D. Chrysostomou, R. Kouskouridas and A. Gasteratos, "Improving the Robustness in Feature Detection by Local Contrast Enhancement," 2012 IEEE International Conference on Image Systems and Techniques Proceedings, pp. 1-6, Jul. 2012.
YOLO Real Time Object Detection, located at pjreddie.com/darknet/yolo/, pp. 1-7, taken on Aug. 12, 2020.
Luminance Contrast, found at colorusage .arc. nasa .gov/luminance_cont.php, pp. 1-7, taken on Dec. 2, 2020.
Multiple Object Tracking Benchmark, located at motchallenge.net, pp. 1-3, taken on Aug. 12, 2020.
Information Entropy Measure for Evaluation of Image Quality, Du-Yih Tsai, Yongbum Lee, Eri Matsuyama, J Digit Imaging. Sep. 2008; 21(3): pp. 338-347. Published online Jun. 19, 2007. doi: 10 1007/s10278-007-9044-5.
A. Dokhanchi, H.B. Amor, J.V. Deshmukh, and G. Fainekos, "Evaluating perception systems for autonomous vehicles using quality temporal logic," International Conference on Runtime Verification, 2018, pp. 1-7.
R.R. da Silva, V. Kurtz, and M. Hebert, "Active Perception and Control from Temporal Logic Specifications," arXiv:1905.03662, 2019, pp. 1-6.
S. Jha, V. Raman, D. Sadigh, and S.A. Seshia, "Safe Autonomy Under Perception Uncertainty Using Chance-Constrained Temporal Logic," Journal of Automated Reasoning, 2018, pp. 43-62.
D. Sadigh and A. Kapoor, "Safe control under uncertainty with Probabilistic Signal Temporal Logic," in Proc. Of Robotics: Science and Systems, 2016, pp. 1-10.
Joseph Redmon, Santosh Divvala, Ross Girshick, Ali Farhadi; The IEEE Conference on Computer Vision and Pattern Recognition (CVPR), 2016, pp. 779-788.
N. Wojke, A. Bewley and D. Paulus, "Simple online and realtime tracking with a deep association metric," 2017 IEEE International Conference on Image Processing (ICIP), Beijing, 2017, pp. 3645-3649.
YOLO: Real-Time Object Detection, https://pjreddie.com/darknet/yolo/, downloaded Dec. 15, 2020.
Office Action 1 for U.S. Appl. No. 17/030,354, dated May 6, 2021.
Response to Office Action 1 for U.S. Appl. No. 17/030,354, dated Aug. 5, 2021.
"Wordnet | A Lexical Database For English". Wordnet.Princeton. Edu, 2010. https://wordnet.princeton.edu/, downloaded Mar. 9, 2021, pp. 1-2.
Tripathi, Subarna, et al. "Using scene graph context to improve image generation." arXiv preprint arXiv:1901.03762 (2019), pp. 1-13.
Sadigh, Dorsa, and Ashish Kapoor. "Safe control under uncertainty with probabilistic signal temporal logic." (2016), pp. 1-10.
Krizhevsky, Alex, Ilya Sutskever, and Geoffrey E. Hinton. "Imagenet classification with deep convolutional neural networks." Advances in neural information processing systems, vol. 2, (2012), pp. 1097-1105.
Caesar, Holger, Jasper Uijlings, and Vittorio Ferrari. "Coco-stuff: Thing and stuff classes in context." Proceedings of the IEEE Conference on Computer Vision and Pattern Recognition. 2018, pp. 1209-1218.
Kirillov, Alexander, et al. "Panoptic segmentation." Proceedings of the IEEE Conference on Computer Vision and Pattern Recognition. 2019, pp. 9396-9405.
Xiong, Yuwen, et al. "Upsnet: A unified panoptic segmentation network." Proceedings of the IEEE Conference on Computer Vision and Pattern Recognition. 2019, pp. 8810-8818.

(56) References Cited

OTHER PUBLICATIONS

Kirillov, Alexander, et al. "Panoptic feature pyramid networks." Proceedings of the IEEE Conference on Computer Vision and Pattern Recognition. 2019, pp. 6392-6401.

Redmon, Joseph, and Ali Farhadi. "Yolov3: An incremental improvement." arXiv preprint arXiv:1804.02767 (2018), pp. 1-6.

He, Kaiming, et al. "Mask r-cnn." Proceedings of the IEEE international conference on computer vision. 2017, pp. 2980-2988.

Chen, Liang-Chieh, et al. "Semantic image segmentation with deep convolutional nets and fully connected crfs." arXiv preprint arXiv:1412.7062 (2014), pp. 1-14.

Speer, Robert, Joshua Chin, and Catherine Havasi. "Conceptnet 5.5: An open multilingual graph of general knowledge." Thirty-First AAAI Conference on Artificial Intelligence. 2017, pp. 4444-4451.

Mikolov, Tomas, et al. "Distributed representations of words and phrases and their compositionality." Advances in neural information processing systems. 2013, pp. 1-9.

Bojanowski, Piotr, et al. "Enriching word vectors with subword information." Transactions of the Association for Computational Linguistics 5 (2017): pp. 135-146.

Joulin, Armand, et al. "Bag of tricks for efficient text classification." arXiv preprint arXiv:1607.01759 (2016), pp. 1-5.

Ren, Shaoqing, et al. "Faster r-cnn: Towards real-time object detection with region proposal networks." Advances in neural information processing systems. 2015, pp. 1-9.

The International Search Report and The Written Opinion of the International Searching Authority for PCT/US2020/066972; dated Apr. 16, 2021.

Wu, Y., et al., "Active Control of Camera Parameters for Object Detection Algorithms," ariv.org, Cornell University Library, NY, 2017, pp. 1-7.

Anand, B., et al., "Specifying and Evaluating Quality Mertics for Vision-based Perception Systems," 2019 Design, Automation & Test in Europe Conference & Exhibition, EDAA, pp. 1433-1438.

Erkan, T.C., et al., "Simulation-based Adversarial Test Generation for Autonomous Vehicles with Machine Learning Components," 2018 IEEE Intelligent Vehicles Symposium, pp. 1555-1562.

\* cited by examiner

GENERATION AND USAGE OF SEMANTIC FEATURES FOR DETECTION AND CORRECTION OF PERCEPTION ERRORS

CROSS-REFERENCE TO RELATED APPLICATIONS

This is a Continuation-in-Part application of U.S. application Ser. No. 17/030,354, filed Sep. 23, 2020, which is a non-provisional patent application of U.S. provisional application No. 62/905,059, filed on Sep. 24, 2019, and U.S. provisional application No. 62/984,713, filed on Mar. 3, 2020, the entirety of which are incorporated herein by reference.

The present application also claims the benefit of and is a non-provisional patent application of U.S. 62/984,728, filed on Mar. 3, 2020, the entirety of which is incorporated herein by reference.

BACKGROUND OF INVENTION

(1) Field of Invention

The present invention relates to perception systems and, more specifically, to a perception system using semantic features for detection and correction of perception errors.

(2) Description of Related Art

Perception systems are commonly used for object recognition and tracking. In the current landscape, deep-learning powers a major portion of a state-of-the-art perception system (see the List of Incorporated Literature References, Literature Reference No. 4). These systems are inherently hard to decipher and understand, which makes reasoning about its successes and failures a difficult task. In addition, most perception systems today operate solely on the basis of appearance-based information, be it three-dimensional depth information from a light detection and ranging system (LiDAR) or visual information in the form of an image from an electro-optical sensor. When compared to human perception, current state-of-the-art perception systems lack conceptual information about physics of the world, notions of relationships between entities, and task-specific context.

Further, today's perception systems are plagued with issues related to false-positive detections, missed detections, misclassifications, broken object tracks, category switching in tracks, etc. The reliability of perception systems is the dominant barrier of adoption for autonomous systems. Thus, to address these issues, current perception systems employ sensor and sensor modality redundancy to overcome the lacking perception performance. While redundancy attempts to resolve some of these issues, use of redundant systems dramatically increases the necessary size, weight and power (SWAP) of the system. This invention has the potential to decrease SWAP by removing the need for redundancy.

Thus, a continuing need exists for a perception system that provides for machine-understanding of semantic information and error correction while decreasing SWAP without the need for redundancy.

SUMMARY OF INVENTION

This disclosure provides a system for detecting and correcting perception errors in a perception system. In one aspect, the system comprises one or more processors and a memory. The memory is a non-transitory computer-readable medium having executable instructions encoded thereon, such that upon execution of the instructions, the one or more processors perform several operations, such as generating a list of detected objects from perception data of a scene; generating a list of background classes from backgrounds in the perception data associated with the list of detected objects; for each detected object in the list of detected objects, identifying a closest background class from the list of background classes; determining an object embedding vector for the object class; determining a background class embedding vector for the closest background class; and determining a semantic feature based on a distance between the object embedding vector and the background class embedding vector.

In another aspect, the system performs operations of generating a probabilistic distribution for the semantic feature, the probabilistic distribution having true positive and false positive distributions; identifying lower and upper bounds for the true positive distribution such that an area between the lower and upper bounds represents a confidence probability, $P_{TP}$, of a true positive probe, such that the confidence probability, $P_{TP}$, is an axiom for an input perception parameter; adjusting the input perception parameter based on the axiom to generate an optimal perception parameter; and adjusting one or more perception parameters of the perception system based on the optimal perception parameter.

In another aspect, the semantic feature is a cosine similarity metric.

Further, the semantic feature is a conditional random fields (CRF) feature where co-occurrence statistics are obtained through a probabilistic framework, with a maximum a posteriori probability inference used to determine a likelihood of co-occurring objects.

In another aspect, the system performs an operation of causing an autonomous vehicle to initiate a physical operation based on the optimal perception parameter.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
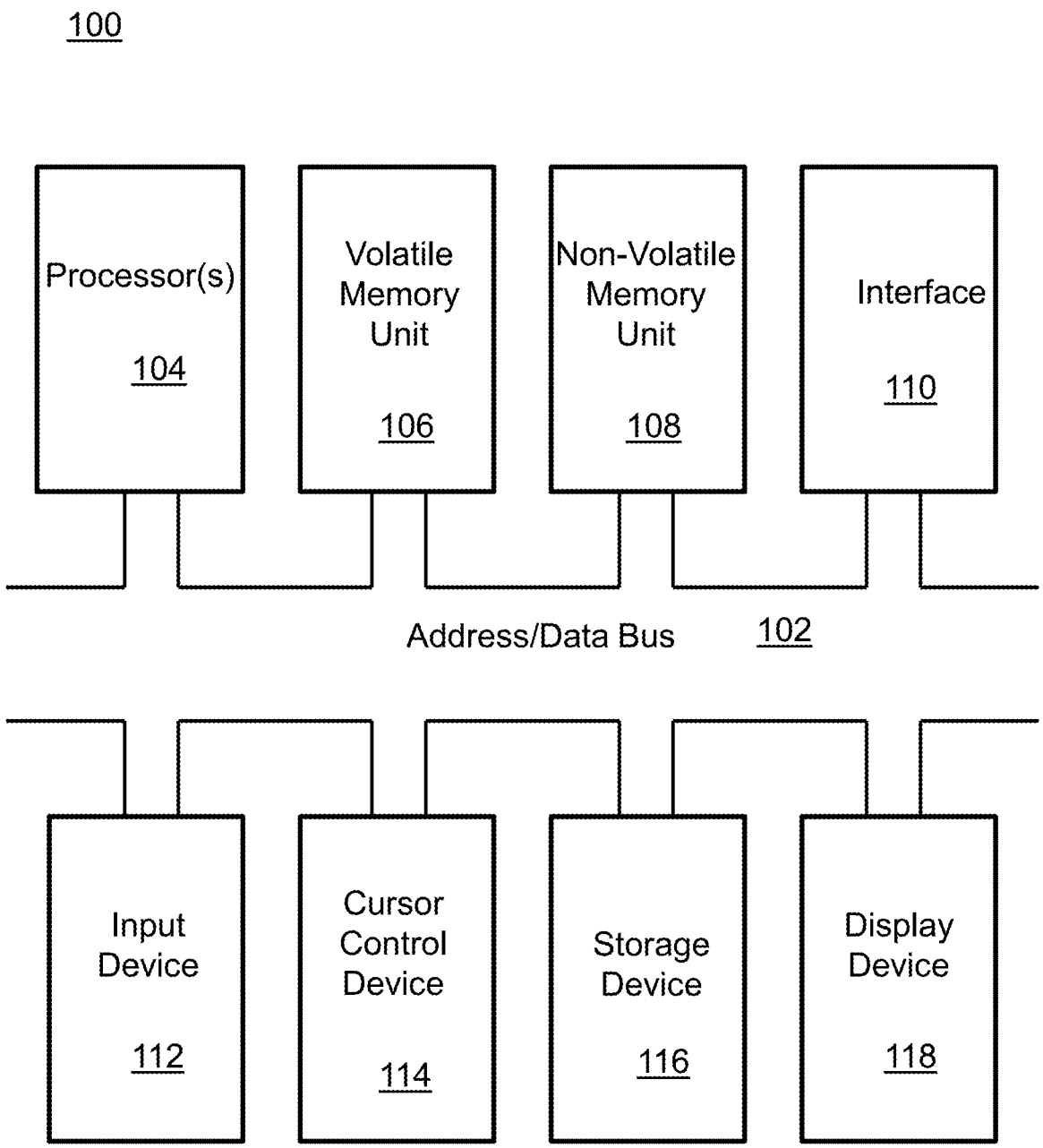
FIG. 1 is a block diagram depicting the components of a system according to various embodiments of the present invention.

The present invention relates to a perception system using semantic features for detection and correction of perception errors. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. "Wordnet|A Lexical Database For English". *Wordnet-.Princeton.Edu,* 2010.
2. Tripathi, Subarea, et al. "Using scene graph context to improve image generation," *arXiv preprint arXiv:* 1901.03762(2019).
3. Sadigh, Dorsa, and Ashish Kapoor. "Safe control under uncertainty with probabilistic signal temporal logic." (2016),
4. Krizhevsky, Alex, Ilya Sutskever, and Geoffrey F Hinton. "Imagenet classification with deep convolutional neural networks," *Advances in neural information processing systems,* Vol. 2, pp. 1097-1105, 2012.
5. Caesar, Holger, Jasper Uijlings, and. Vittorio Ferrari. "Coco-stuff: Thing and stuff classes in context." *Proceedings of the IEEE Conference on Computer Vision and Pattern Recognition.* 2018.
6. Kirillov, Alexander, et al. "Panoptic segmentation." *Proceedings of the IEEE Conference on Computer Vision and Pattern Recognition.* 2019.
7. Xiong, Yuwen, et al. "Upsnet: A unified panoptic segmentation network," *Proceedings of the IEEE Conference on Computer Vision and Pattern Recognition.* 2019.
8. Kirillov, Alexander, et al, "Panoptic feature pyramid networks." *Proceedings of the IEEE Conference on Computer Vision and Pattern Recognition.* 2019,
9. Redmon, Joseph, and Ali Farhadi. "Yolov3: An incremental improvement." *arXiv preprint arXiv:*1804.02767 (2018).
10. He, Kaiming, et al, "Mask r-cnn." *Proceedings of the IEEE international conference on computer vision.* 2017.
11. Chen, Liang-Chieh, et al. "Semantic image segmentation with deep convolutional nets and fully connected crfs." *arXiv preprint arXiv:* 1412.7062 (2014),
12. Speer, Robert, Joshua Chin, and Catherine Havasi. "Conceptnet 5.5: An open multilingual graph of general knowledge." *Thirty-First AAAI Conference on Artificial Intelligence.* 2017.
13. Mikolov, Tomas, et al. "Distributed representations of words and phrases and their compositionality." *Advances in neural information processing systems.* 2013.
14. Bojanowski, Piotr, et al. "Enriching word vectors with subword information." *Transactions of the Association for Computational Linguistics* 5 (2017): 135-146.
15. Joulin, Armand, et al. "Bag of tricks for efficient text classification." *arXiv preprint arXiv:*1607.01759 (2016).
16. U.S. application Ser. No. 17/030,354, filed Sep. 23, 2020, entitled, "System And Method Of Perception Error Evaluation And Correction By Solving Optimization Problems Under The Probabilistic Signal Temporal Logic Based Constraints".
17. Ren, Shaoqing, et al. "Faster r-cnn: Towards real-time object detection with region proposal networks." *Advances in neural information processing systems.* 2015.

(2) PRINCIPAL ASPECTS

Various embodiments of the invention include three "principal" aspects. The first is a perception system using semantic features for detection and correction of perception errors. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
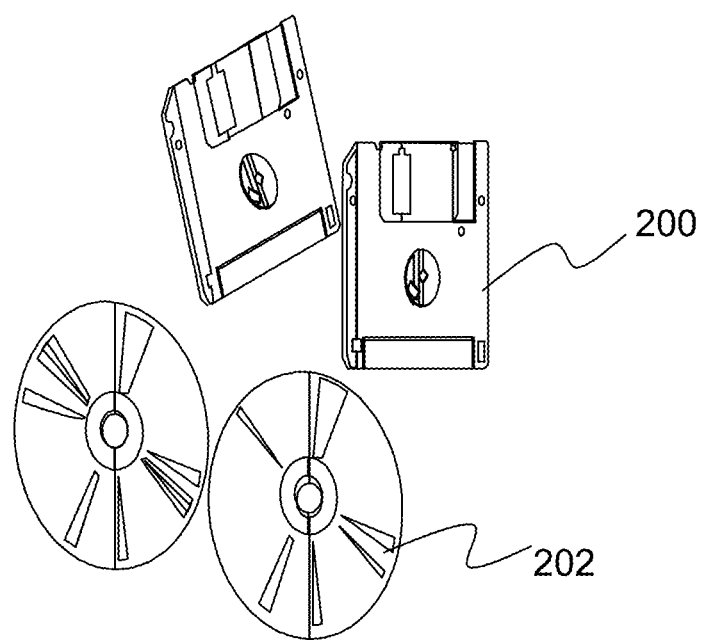
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

As noted above, the present disclosure is directed to a perception system. The disclosure provides a system and method of generating features from semantic information and using such information for detecting and correcting errors in perception systems. The process enables the creation of feature embedding vectors in semantic space. The embedding may encode informational cues including, but not limited to, object co-occurrence, spatial relations, object/background taxonomy, word ontologies, scenegraph-based context and etymological relations. An understanding of word ontologies and scenegraph-based context can be found in Literature Reference Nos. 1 and 2, respectively. The ability to encode such information in an embedding vector helps a machine make sense of the context in perception systems instead of relying purely on appearance-based features. The disclosed system takes advantage of such semantic features using a probabilistic signal temporal logic framework to detect and correct perception errors including, but not limited to, object misclassification, missed object detections, broken object tracks and false positive object detection. An understanding of probabilistic signal temporal logic can be found in Literature Reference No. 3. The system may use the semantic information to create one or more constraints for the probabilistic signal temporal logic framework which is used to detect and correct the perception errors in such a perception system.

In detecting and correcting perception errors, the system of the present disclosure is more robust and computational less expensive than the prior art and, importantly, is highly-performant for essential applications. The system of the present disclosure provides several unique advantages over the prior art, including (1) the conversion of contextual semantic information from images and other sensor output to machine-understandable feature embedding vectors, (2) the usage of semantic feature embeddings to create constraints and axioms in a probabilistic temporal logic framework, (3) the improved evaluation and correction of perception errors aided by semantic context in a formally verifiable manner, and (4) the formulation of a dependency model between objects in the scene, allowing for use of the dependency model to improve detection accuracy.

As can be appreciated by those skilled in the art, the system has several applications that employ a perception system. Some non-limiting examples include use in intelligence, surveillance and reconnaissance applications (ISR), autonomous vehicles and other unmanned aerial systems, as well as object recognition and tracking. The system described in the invention may also be used to benchmark other perception systems. Specific details are provided below.

(4) SPECIFIC DETAILS OF VARIOUS EMBODIMENTS

The present disclosure describes a method and system to generate a feature embedding that encodes semantic information and that uses such feature embeddings to detect and correct errors. The system first generates the semantic features to be used as probes. Using these probes, the system sets up a probabilistic signal temporal logic (PSTL), which provides axioms. With these axiom-based constraints, an optimization problem is solved to synthesize controls for the perception system which reduce perception errors.

Figure 3:
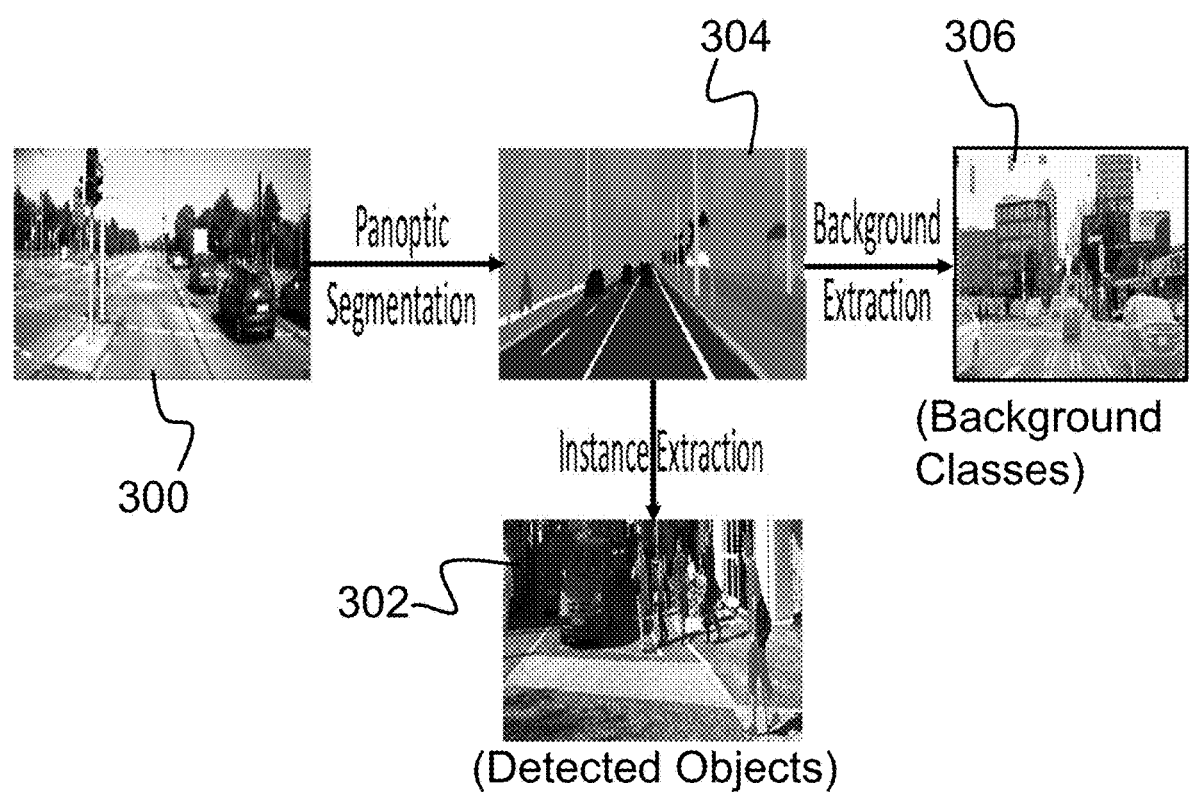
FIG. 3 is an illustration depicting pre-requisites for generating semantic features according to various embodiments of the present invention.

As noted above, the system first generates semantic features to be used as probes. However, and as shown in FIG. 3, there are some pre-requisites to computing the semantic feature embedding. For example, from the original input perception data 300 (e.g., image, etc.), the system must first obtain a list of detected objects 302 in the image with their locations (via instance extraction) and a list of background classes 306 (defined as "stuff" in COCO-stuff (see Literature Reference No. 5) along with their image masks (via background extraction). The list of objects/classes detected in the image are provided by a perception system. The system of the present disclosure sits on top of (i.e., works with) a perception system; in other words, the system of the present disclosure uses the perception system's outputs and, based on the additional semantic context, confirms/improves the results of the perception system. The system of the present disclosure can generate semantic features for any object class from prior domain knowledge but, in one aspect, the present system is not responsible for detecting these objects in the image.

These pre-requisites can be computed from the original input perception data 300, being, for example, electro-optical sensor images, lidar depth-maps, radar detections or any combination thereof. For the sake of this description, images from a camera will be used. For a camera image, these pre-requisites can be computed using a state-of-the-art panoptic segmentation 304 model (see Literature Reference Nos. 6, 7, and 8). Alternatively, any performant object detection technique (e.g., see Literature Reference Nos. 8, 9, and 10) can be used in tandem with a semantic segmentation technique (see Literature Reference No. 11) to obtain the same pre-requisites, which includes an identified object class associated with each detected object as well as the image location of each of the detected objects.

To use this method of generation, this system needs a conceptual word embedding. For the sake of this description and as a non-limiting example, ConceptNet Numberbatch is used (see Literature Reference No. 12).

The following pseudocode can be followed to generate the semantic features for object-background relationships:
   detected_objects=List of detected objects and locations
   background_classes=List of detected background classes and their location
   for each object in detected_objects
      background_clas=findClosestBackgroundClass(object.location, background_classes)
      object_embedding=concept_embedding(object.class)

background_embedding=concept_embedding(background_class)

semantic_feature=cosineSimilarity(object.class, background_class)

Figure 4:
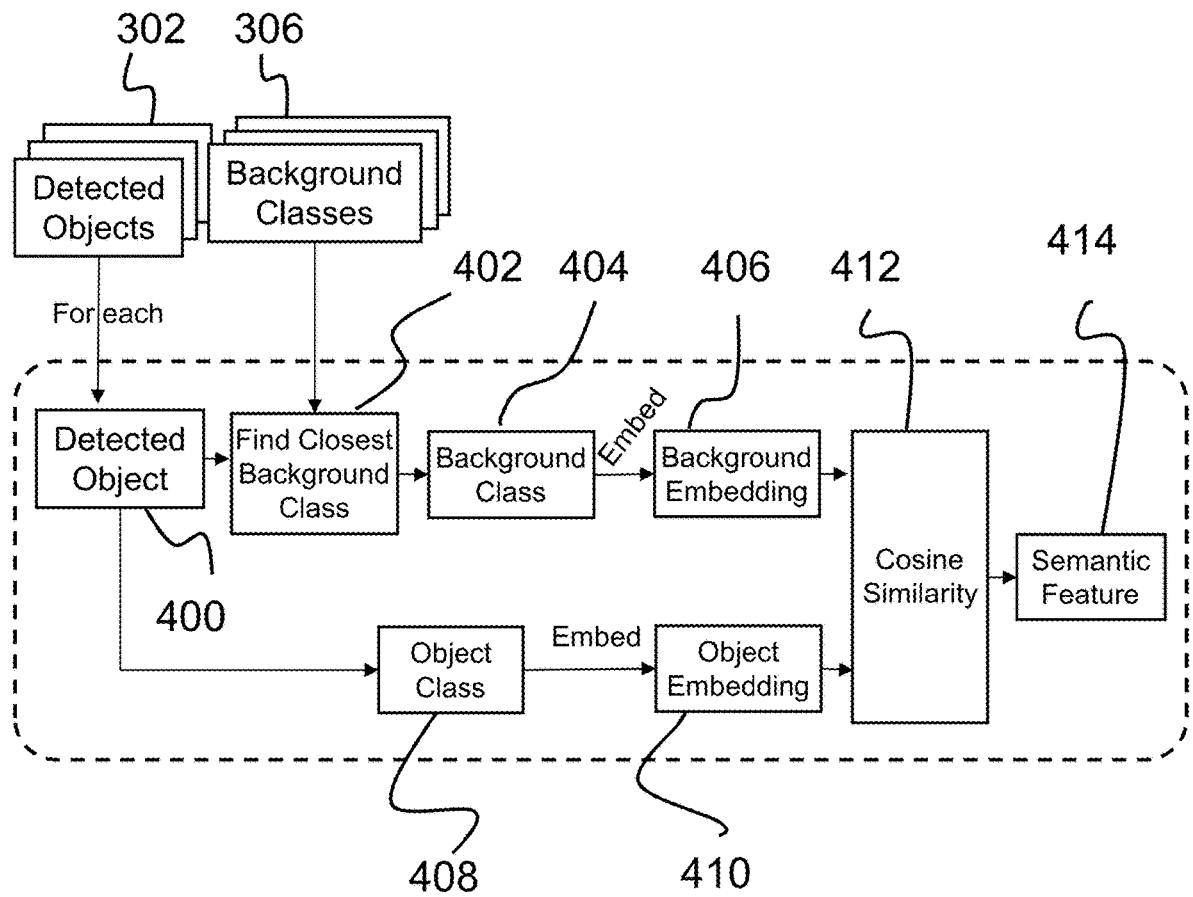
FIG. 4 is a flowchart depicting a semantic feature generation process according to various embodiments of the present invention.

The process for generating the semantic features is further illustrated in FIG. 4. For each detected object 400 from the list of objects 302, the system finds the closest background 402 from the list of background classes 306 by using the minimum Euclidian distance from the object to the background pixels. This is done by comparing the detected object 400 against each background class in the list of background classes 306 to identify the background class 404 with the minimum distance. It should be noted that the previous example is not the only way of computing the closest background class. Any method of computing the closest background class could work as part of the process of the present disclosure. Cosine similarity is just one example of a metric that can be used as a feature. It is only used as an example as the invention is just as applicable when using a different similarity metric or creating a different type of semantic feature apart from similarity.

Using a conceptual word embedding, the system then proceeds to find the embedding vector for the object class 408 and the closest background class 404, via object embedding 410 and background embedding 406, respectively. The system then determines the cosine similarity 412 as a similarity metric between the embedding vectors 410 and 406 for the object 408 and background class 404, respectively, using the following:

$$\text{similarity} = \cos(\theta) = \frac{A \cdot B}{\|A\| \, \|B\|} = \frac{\sum_{i=1}^{n} A_i B_i}{\sqrt{\sum_{i=1}^{n} A_i^2} \sqrt{\sum_{i=1}^{n} B_i^2}},$$

where A denotes the object class, B denotes the corresponding closest background class. Theta is the angle between the two vectors A and B in high-dimensional space. The cosine of theta is an indicator of the similarity between vectors A and B.

The calculated cosine similarity 412 can be used as a semantic feature 414. This feature 414 should encode whether the objects are closely related or not by providing a similarity score between −1 and 1. Since a conceptual embedding is used instead of a simple word embedding, like word2vec or fasttext (see Literature Reference Nos. 13 through 15), the embedding already encodes semantic information instead of just using linguistic context.

Similar to how semantic features are calculated for object-background coherence, the system can also calculate object-object coherence. Two objects can be said to be coherent if their co-existence is reasonable. For example, if one were to detect a handbag right next to a person in an image, then it can be said that it is reasonable because people carry handbags. While if one were to detect a handbag right next to a traffic light, one might be suspicious about the results of the perception system. In the present case, to calculate the semantic features for object-object coherence, the system can compute the cosine similarity for the concept embeddings of two object classes located close or adjacent to each other in the source image.

Figure 5:
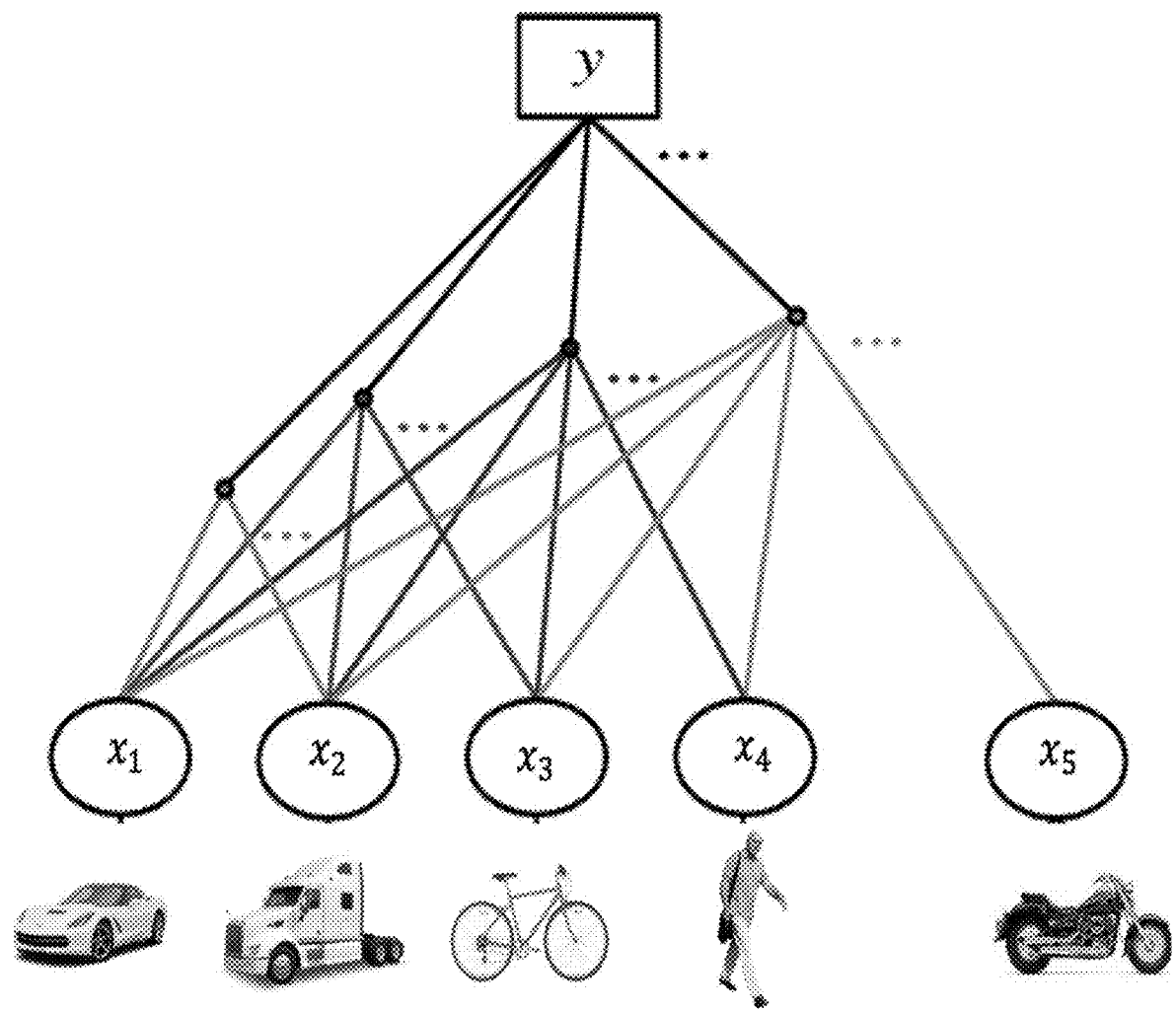
FIG. 5 is an illustration depicting a structure of conditional random fields (CRF) over five different example objects according to various embodiments of the present invention.

In the system of the present disclosure, the system uses conditional co-occurrence statistics between objects to further assess potential errors in object detection. 'Conditional' because considering the relationships between all semantic objects for a given scenario would be redundant if not computationally overkill and 'co-occurrence statistics' to learn the dependencies between objects. To do so, a conditional random fields (CRF) framework is formulated where the co-occurrence statistics is obtained through a probabilistic framework where conditioning on the scenario/scene uses a maximum a posteriori probability (MAP) inference to assess the likelihood of co-occurring objects. A goal is to construct a graphical model that describes correlations between objects in the scene and make predictions conditioned on the scene. For more details, consider a graphical model G=(V, E), where V is a set of M nodes, each corresponding to a particular object. E is a set of edges between cliques. The cliques can be defined with any combination of any number of objects; however, the inference may become intractable very quickly. FIG. 5, for example, illustrates the range of possible cliques in a particular scenario. The objective here is to exploit the mutual information within objects (for example, information that different objects have in common with one another and conditioned on particular scene, e.g. urban driving area) to characterize each model. The mutual information is also not limited to commonality. The term mutual is used to be general because sometimes the pattern is not common but consistently accrue between two objects; the statistical consistency is what is referred to as mutual information. This can be written as, $$p(y|x; \theta) = \frac{1}{Z(x)} \prod_{c \in C} \Phi_c(y, x; \theta)$$

where the clique potentials $\Phi_c$ (y, x) are non-negative real values obtained from the feature functions of each cliques, and where p is the conditional probability, x and y's are semantic features of object pairs in the image. If the cliques are two, they are referred to as a pair; for the cases that go beyond pairwise analysis, the computation gets heavy exponentially. In theory, if C is all possible cliques then that would be all combinations of objects; but in practice the inference is intractable. Thus, the process sticks to pairwise analysis; however, for the sake of generality, the process is described as cliques to illustrate that it is not limited to just pairs.

Feature functions define the connections between nodes. As a non-limiting example and with respect to the experiments described herein, since the process was focusing on the pairwise interaction, there were two feature functions to design: 1) unary feature functions: which was computed with the confidence of object detector (before semantic feature generation) and then (2) the pairwise feature function which was computed with cosine similarity between the semantic features. The number of feature functions that each clique c has is a design choice. On one hand, it is desirable to make sure that the feature function can capture the discriminative information, and on the other hand it is desirable to make sure that the process does not introduce too many parameters to overfit or make the computation intractable. Thus, the upper bound is determined such that if the maximum number of objects in a clique is N and the minimum number is one, then the lower bound is N and the upper bound is all combinations of two plus all combinations of three . . . +N! Each clique potential is factorized over a set of feature functions $f_k^c(.)$, where k is the index of feature functions in the clique c. Typically, the significance of each feature function ($\theta_k^c$) is learned from co-occurrence statistics (this is similar to say hand-bag and person are often detected next each other conditioned on urban scene), however, in this framework the distance measure is at the conceptual level. Thus, each feature function $f_k^c$ has associated with it a weighting factor or "significance" $\theta_k^c$. The higher the weight the more discriminative the pair is in classifying a given object in the scene.

Finally, to make a probability measure, use the normalizing term Z(x), also referred as the partition function defined over all possible cliques as follows:

$$Z(x;\theta)=\Sigma_y\Pi_{c\in C}\{\Phi_c(y,x;\theta)\}$$

In this framework the weight of feature functions are obtained directly from the normalized co-occurrence statistics (which could potentially be obtained using normalized cosine distance). In the standard CRF terminology, the potentials are written as:

$$\Phi_c(y, x; \theta) = \exp\left(\sum_k \theta_k^c f_k^c(y, x)\right)$$

The value of each parameter $\theta_k$ is directly influenced by the sparsity of the data (which is either the data used for training or potentially from prior knowledge, such as from ConceptNet). Increasing the sparsity improves the expressive power of CRF structures, which is also the underlying rationale in the case of Hidden Markov Models (HMM) or Dynamic Bayesian Networks (DBN).

Once the parameters are trained (based on co-occurrence probabilities), MAP inference is used for each test sample to select the label in which its parameters return the highest conditional likelihood. For example, conditioning on the scenario to be on the urban objects, the objects 'Car' and 'Bus' would have higher correlation compared with 'Car' and 'Airplane'.

Figure 6:
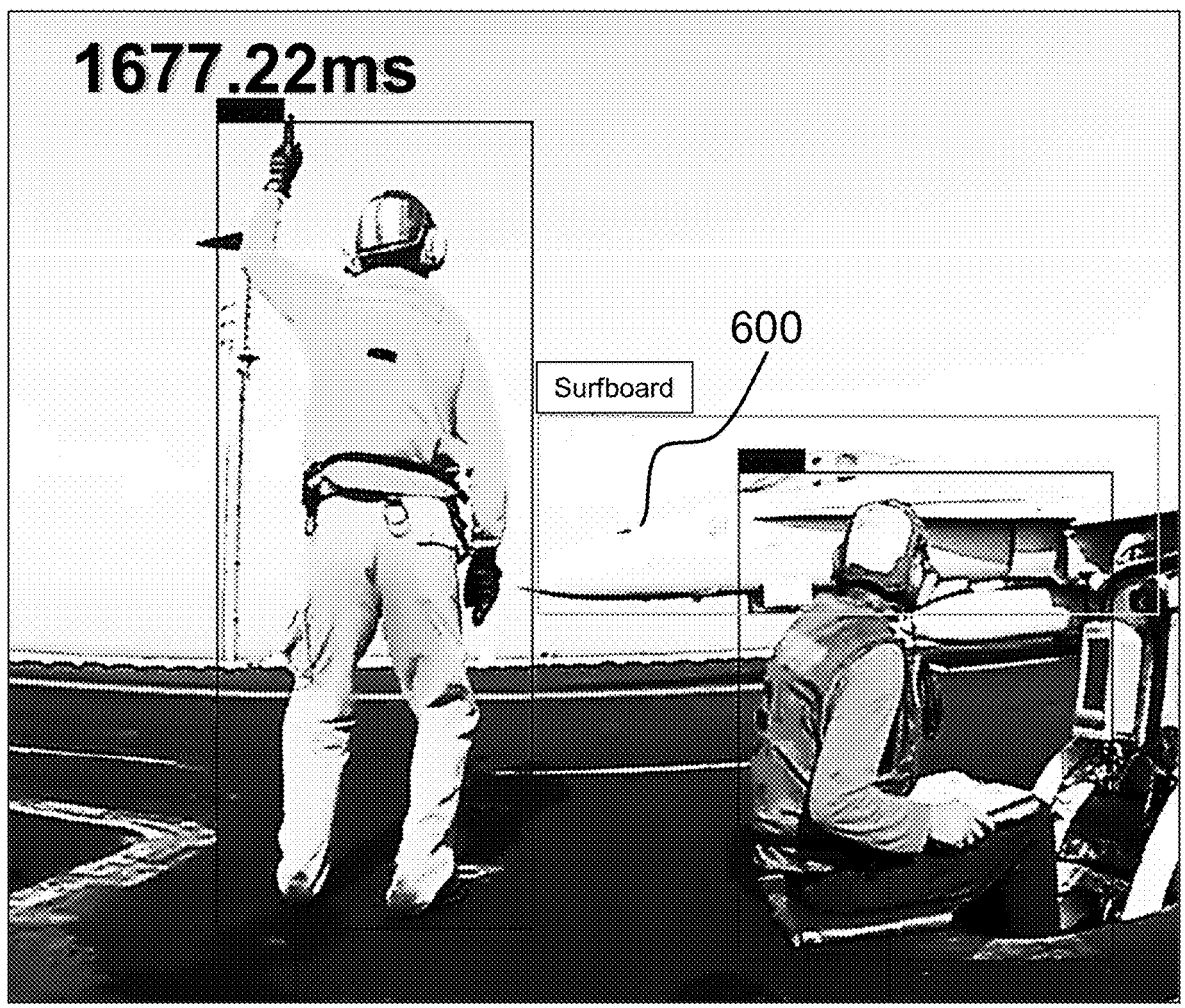
FIG. 6 is an illustration depicting example misclassifications in object detection according to various embodiments of the present invention.

This generated semantic feature can be used to confirm object-background coherence. For example and as shown in FIG. 6, an airplane 600 is misclassified as a surfboard. In this situation, using the semantic feature can be beneficial. The closest background classes for the surfboard detected in the image are sky and road. Using this information, the system can calculate the semantic feature based on object-background coherence. If an object detection network can provide additional potential classes/categories for the detected object, then the system could also calculate the semantic feature for those classes. In this example, the same semantic feature for an airplane is shown in the following table.

| Object Class | Background Class | Semantic Feature |
| --- | --- | --- |
| Surfboard | Sky | −0.0145 |
| Airplane | Sky | 0.2829 |
| Surfboard | Road | 0.0319 |
| Airplane | Road | 0.0754 |

Based on the computed semantic feature values in the table above, it is clear that surfboard and sky are not close in semantic space and are very dissimilar. Based on this observation alone, there is a clear signal from the semantic feature that the surfboard may be an incorrect detection. Most recent computer vision techniques employ a proposal generation approach, where first object proposals are generated and then the proposals are evaluated and classified. In trying to correct an error using this semantic feature, the system can calculate the semantic feature for the candidate categories for the surfboard bounding box proposal. This is shown in the table above. The system can compare the semantic features from the combination of airplane with sky and road background classes to the semantic features from the combination of surfboard and the background classes. Looking at the values in the table, it is evident that an airplane is significantly more coherent with sky and road than a surfboard. Using this information, the detected error can be fixed to have the correct category using candidate categories from region proposal networks. See Literature Reference No. 17 for a discussion of regional proposal networks.

Figure 7:
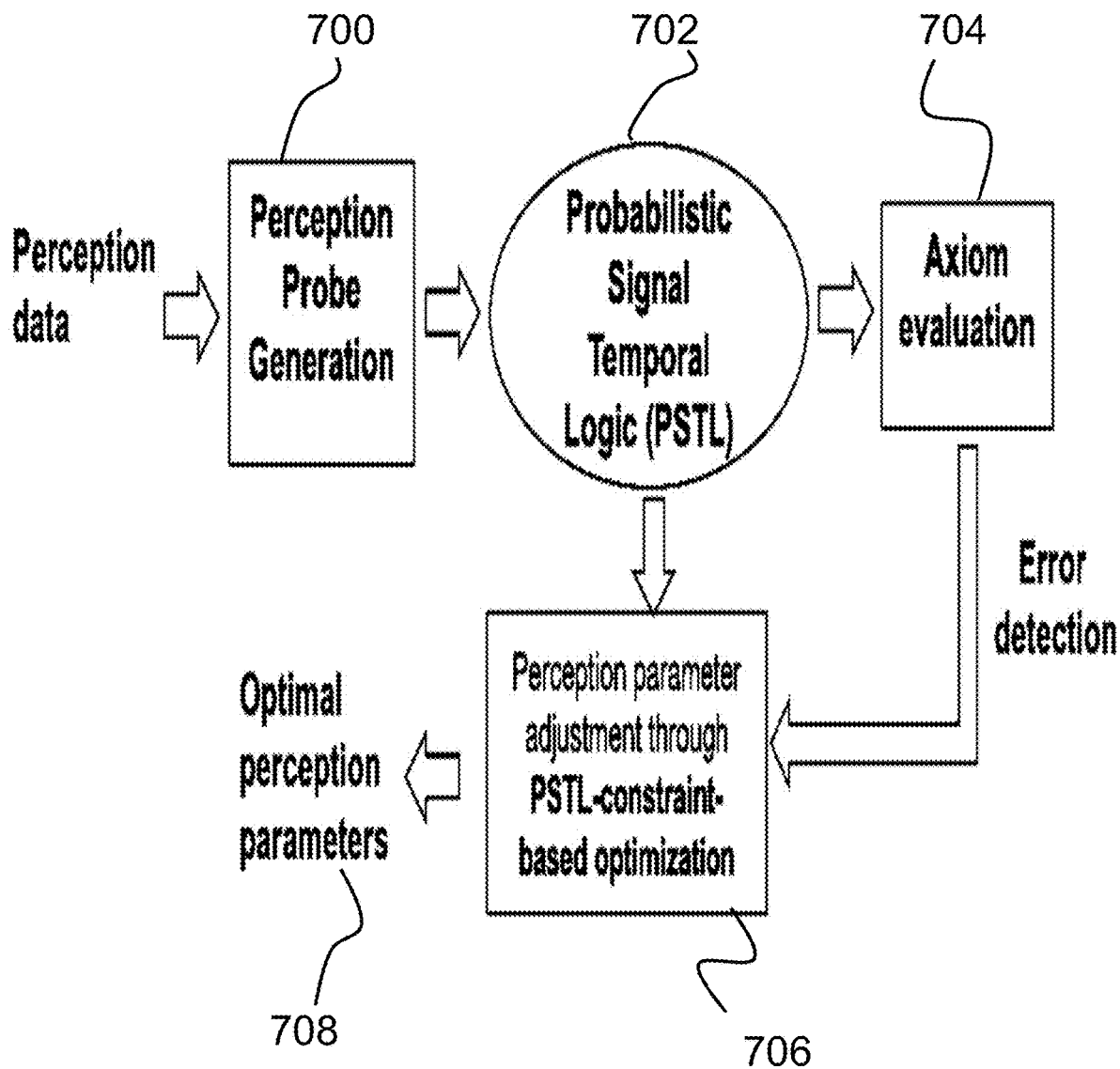
FIG. 7 is a flowchart depicting an overview of the PSTL framework according to various embodiments of the present invention.
Figure 8:
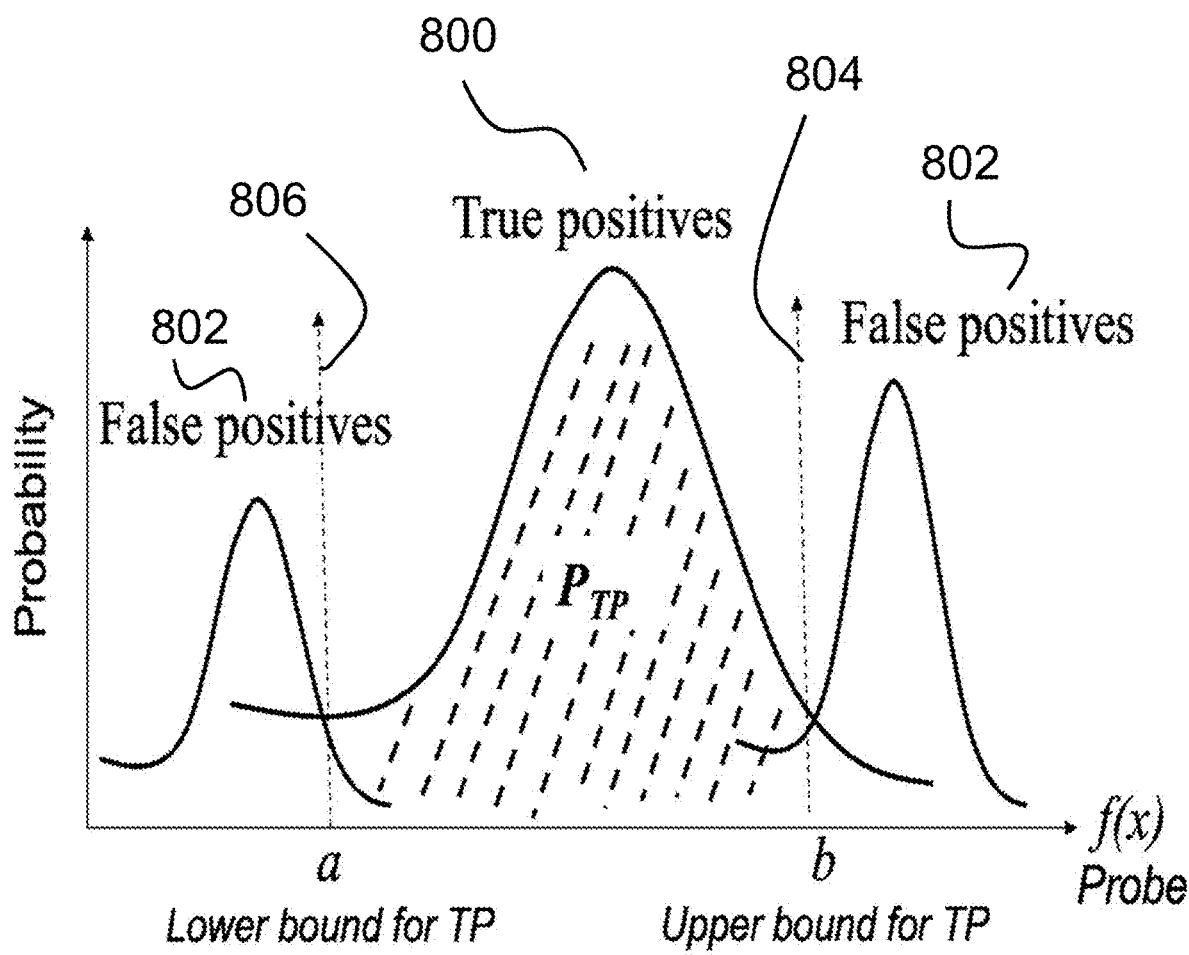
FIG. 8 is a graph depicting sample probability distributions of a probe according to various embodiments of the present invention.

As shown in FIG. 7, the invention of the present disclosure employs a Probabilistic Signal Temporal Logic (PSTL) 702 framework (see Literature Reference No. 16 for PSTL) to use the semantic features described above. The semantic features (illustrated as element 414 in FIG. 4) are generated as part of the Perception Probe Generation 700 process and used as the probes. The PSTL framework 702 uses the generated probes including, but not limited to, object size, aspect ratio, contrast and entropy. Thus, the semantic features will be used as a probe in the PSTL 702. For each probe, statistical analysis is used to generate true positive and false positive probabilistic distributions based on true positive and false positive detections. FIG. 8, for example, depicts a sample probability distribution of a probe using any suitable process, an example of which is described in Literature Reference No. 16.

By analyzing these true positive 800 and false positive 802 distributions and their intersection, an upper 804 and a lower bound 806 for true positives can be set up. In this example, the shaded area represents the confidence probability, $P_{TP}$, of the true positive probes. Referring again to FIG. 7, describing this as an axiom 704 for PSTL, provides:

$$\forall x, Pr(a \leq f(x,t_s:t_e) \leq b \rightarrow y) \geq P_{TP},$$

where Pr(•) is the predicate and y is the true detection, $t_s:t_e$ means the time sequence between $t_s$ and $t_e$, so $f(x, t_s:t_e)$ is the probe sequence in the time frame of $t_s:t_e$. In this equation, let x be a probe for the corresponding semantic feature, then y will the correct detection of the semantic feature. That means that the probe indicates the semantic feature detection/recognition is valid. Depending on the probe dimensions, the probabilistic function can also be multi-dimensional. Integrating all the available axioms from x provides a "multi-dimensional range" of the corresponding detection or recognition. As noted above, x as used here is a probe or semantic feature, not an axiom.

These axioms 704 can then be used to optimize for ideal perception control parameters 708 which will provide the best true positive to false positive ratio. Thus, the perception control parameters can be adjusted based on the optimization. The perception parameters that are adjusted may be used to modify the input to the perception system, or to modify a parameter in the hardware of the perception system, or to modify a parameter in the model inside the perception system. All three of these cases, input, hardware and model, are considered to be a part of the perception system.

A PSTL-constraint based optimization 706 is used (see, for example, Literature Reference No. 16) to optimize for ideal perception control parameters 708. 'Perception dynamics' must first be constructed in order to set up the optimization problem, as shown below:

$$x_t = f_t(x_t) + g_t(u_t),$$

where $x_t$ is the probe state at time t and $x_{t'}$ is the predicted probe in the next time frame, t'. Here, x is defined to be a probe state; it is a semantic feature that is being used as a probe. $f_t(\bullet)$ is the state transition function and $g_t(\bullet)$ is the input function with the control input, $u_t$ (it should be noted that the state transition function $f_t$ is not to be confused with the the probe sequence $f$ or the feature function $f_k{}^c$). A goal is to achieve the optimal $u_t$ to reduce perception errors and, in doing so, generate the optimal perception parameters 708 (i.e, $u_{OPT}$). In order to meet the goal, the optimization problem is set to:

$$u_{OPT} = \arg\min_{u_t} J(x_t, u_t)$$

where $J(\bullet)$ is the cost function of estimating perception errors. Therefore, minimizing $J(\bullet)$ can achieve the optimal perception module control input. Eventually, the final optimization formula with the two or more PSTL-based constraints for probes, $f(x_t)$, $g(z_t)$, etc. becomes, $$u_{OPT} = \arg\min_{u_t} J(x_t, z_t, u_t)$$
$$\text{s.t. } \forall x_t, Pr(a \leq f(x_t, t_s:t_e) \leq b \to y) \geq P_{TPx}$$
$$\forall z_t, Pr(g(z_t, t_s:t_e) \leq c \to w) \geq P_{TPz}.$$

Using the approach described above, the following sample PSTL axiom can be set up for the semantic object-background coherence:

$$\forall z, Pr(g(z,t_s:t_e) > 0.2 \to \text{Airplane}) \geq 0.99$$

In this equation, z is the semantic feature. For semantic features, since the cosine similarity value will always be between −1 and 1, and a cosine similarity of 1 would always be the ideal scenario, the process can be designed to disregard the upper bound and form a one sided lower-bound only constraint. In the sample axiom set up above, for an airplane, the semantic object-background coherence feature value should be greater than 0.2 at least 99% of the time $t_s:t_e$ so that PSTL isn't violated. The semantic feature threshold and $P_{TPz}$ will differ from one class to the other. $P_{TPz}$ is the probabilistic constraint on the bounds for true positives. Z and X represent different constraints. In one example, $P_{TPx}$ could be the constraint for the airplane bounds, $P_{TPz}$ could be the constraint for the handbag bounds. Z and X are identifiers in this context, they could be A, B, C or any other letter or phrase.

The output of the present system is a set of constraints that are used to identify and correct perception errors. These perception errors can be corrected in systems with a variety of different applications including, but not limited to, Autonomous Urban Driving, Autonomous Flying, Intelligence Surveillance and Reconnaissance, Search and Rescue. An incorrect detection could lead to the autonomous system following an unwanted trajectory. Thus, the output of system of the present disclosure corrects the wrong detection by adjusting perception parameters, which in turn affects the planning and decision making of this tangible physical autonomous system. For example, the system could cause the autonomous system to alter its movements to correct the trajectory of travel.

In other words, the system of the present disclosure provides a set of one or more constraints, such as those referenced above. These constraints are used to identify perception errors. Then, other object candidates are checked in the image to finally correct the identified error. In one aspect, this error identification and correction are the outputs of the system described in this invention, which can be relayed to a planner to affect, modify and plan a better and safer trajectory for the autonomous system.

As another example, a self-driving vehicle may misclassify a bicycle as a person. Without the present system, the self-driving car would have expected the pedestrian to stay on the sidewalk, when in reality a bicycle is not constrained to a sidewalk. The present system is able to correct this error and accurately inform the self-driving vehicle about a bicycle. Using the system of the present disclosure, the self-driving vehicle will take a tangibly different route in the physical world to restrict itself from getting into a bike lane to avoid a potential accident. In doing so, the system can cause the self-driving vehicle to initiate physical operations through other systems in the vehicle, such as the accelerator, brake, or steering, to avoid collision with the detected object (e.g., bicycle in this example). Thus, in one aspect, the self-driving vehicle will automatically adapt/modify its trajectory to account for the results of the method and system as described herein. As can be appreciated by those skilled in the art, this concept can be extended to a variety of applications, such as unmanned aerial vehicles, robotic equipment in a factory, etc.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting and correcting perception errors in a perception system, the system comprising:
   one or more processors and a memory, the memory being a non-transitory computer-readable medium having executable instructions encoded thereon, such that upon execution of the instructions, the one or more processors perform operations of:
   generating a list of detected objects from perception data of a scene;
   generating a list of background classes from backgrounds in the perception data associated with the list of detected objects;
   for each detected object in the list of detected objects, identifying a closest background class from the list of background classes;
   determining an object embedding vector for the object class;
   determining a background class embedding vector for the closest background class; and
   determining a semantic feature based on a distance between the object embedding vector and the background class embedding vector.

2. The system as set forth in claim 1, further comprising operations of:
  generating a probabilistic distribution for the semantic feature, the probabilistic distribution having true positive and false positive distributions;
  identifying lower and upper bounds for the true positive distribution such that an area between the lower and upper bounds represents a confidence probability, $P_{TP}$, of a true positive probe, such that the confidence probability, $P_{TP}$, is an axiom for an input perception parameter;
  adjusting the input perception parameter based on the axiom to generate an optimal perception parameter; and
  adjusting one or more perception parameters of the perception system based on the optimal perception parameter.

3. The system as set forth in claim 2, wherein the semantic feature is a cosine similarity metric.

4. The system as set forth in claim 2, wherein the semantic feature is a conditional random fields (CRF) feature where co-occurrence statistics are obtained through a probabilistic framework, with a maximum a posteriori probability inference used to determine a likelihood of co-occurring objects.

5. The system as set forth in claim 2, further comprising an operation of causing an autonomous vehicle to initiate a physical operation based on the optimal perception parameter.

6. A computer program product for detecting and correcting perception errors in a perception system, the computer program product comprising:
  a non-transitory computer-readable medium having executable instructions encoded thereon, such that upon execution of the instructions by one or more processors, the one or more processors perform operations of:
    generating a list of detected objects from perception data of a scene;
    generating a list of background classes from backgrounds in the perception data associated with the list of detected objects;
    for each detected object in the list of detected objects, identifying a closest background class from the list of background classes;
    determining an object embedding vector for the object class;
    determining a background class embedding vector for the closest background class; and
    determining a semantic feature based on a distance between the object embedding vector and the background class embedding vector.

7. The computer program product as set forth in claim 6, further comprising operations of:
  generating a probabilistic distribution for the semantic feature, the probabilistic distribution having true positive and false positive distributions;
  identifying lower and upper bounds for the true positive distribution such that an area between the lower and upper bounds represents a confidence probability, $P_{TP}$, of a true positive probe, such that the confidence probability, $P_{TP}$, is an axiom for an input perception parameter;
  adjusting the input perception parameter based on the axiom to generate an optimal perception parameter; and
  adjusting one or more perception parameters of the perception system based on the optimal perception parameter.

8. The computer program product as set forth in claim 7, wherein the semantic feature is a cosine similarity metric.

9. The computer program product as set forth in claim 7, wherein the semantic feature is a conditional random fields (CRF) feature where co-occurrence statistics are obtained through a probabilistic framework, with a maximum a posteriori probability inference used to determine a likelihood of co-occurring objects.

10. The computer program product as set forth in claim 7, further comprising an operation of causing an autonomous vehicle to initiate a physical operation based on the optimal perception parameter.

11. A computer implemented method for detecting and correcting perception errors in a perception system, the method comprising an act of:
  causing one or more processors to execute instructions encoded on a non-transitory computer-readable medium, such that upon execution, the one or more processors perform operations of:
    generating a list of detected objects from perception data of a scene;
    generating a list of background classes from backgrounds in the perception data associated with the list of detected objects;
    for each detected object in the list of detected objects, identifying a closest background class from the list of background classes;
    determining an object embedding vector for the object class;
    determining a background class embedding vector for the closest background class; and
    determining a semantic feature based on a distance between the object embedding vector and the background class embedding vector.

12. The method as set forth in claim 11, further comprising operations of:
  generating a probabilistic distribution for the semantic feature, the probabilistic distribution having true positive and false positive distributions;
  identifying lower and upper bounds for the true positive distribution such that an area between the lower and upper bounds represents a confidence probability, $P_{TP}$, of a true positive probe, such that the confidence probability, $P_{TP}$, is an axiom for an input perception parameter;
  adjusting the input perception parameter based on the axiom to generate an optimal perception parameter; and
  adjusting one or more perception parameters of the perception system based on the optimal perception parameter.

13. The method as set forth in claim 12, wherein the semantic feature is a cosine similarity metric.

14. The method as set forth in claim 12, wherein the semantic feature is a conditional random fields (CRF) feature where co-occurrence statistics are obtained through a probabilistic framework, with a maximum a posteriori probability inference used to determine a likelihood of co-occurring objects.

15. The method as set forth in claim 12, further comprising an operation of causing an autonomous vehicle to initiate a physical operation based on the optimal perception parameter.

* * * * *